United States Patent
Ravishankar et al.

(10) Patent No.: US 10,356,190 B2
(45) Date of Patent: Jul. 16, 2019

(54) ACCESSIBILITY FOR WEB SITES

(71) Applicant: Dell Products L.P., Round Rock, TX (US)

(72) Inventors: Deepak Ravishankar, Bangalore (IN); Kavitha Kanagowder, Bangalore (IN); Mainak Roy, Kolkata (IN); Rathi B, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 250 days.

(21) Appl. No.: 15/015,472

(22) Filed: Feb. 4, 2016

(65) Prior Publication Data

US 2017/0230470 A1 Aug. 10, 2017

(51) Int. Cl.
| | |
|---|---|
| *G06F 9/451* | (2018.01) |
| *H04L 29/08* | (2006.01) |
| *G06F 9/455* | (2018.01) |
| *G09B 21/00* | (2006.01) |

(52) U.S. Cl.
CPC .............. *H04L 67/22* (2013.01); *G06F 9/451* (2018.02); *G06F 9/45512* (2013.01); *G09B 21/009* (2013.01); *H04L 67/02* (2013.01); *H04L 67/146* (2013.01); *H04L 67/306* (2013.01)

(58) Field of Classification Search
CPC ....................................................... H04L 67/22
USPC ........................................................ 709/205
See application file for complete search history.

(56) References Cited

U.S. PATENT DOCUMENTS

| | | | | |
|---|---|---|---|---|
| 2007/0055938 | A1* | 3/2007 | Herring | G06F 17/30905 715/729 |
| 2014/0180846 | A1* | 6/2014 | Meron | G06F 17/3089 705/14.73 |
| 2014/0344839 | A1* | 11/2014 | Woods | H04N 21/488 725/9 |
| 2015/0287043 | A1* | 10/2015 | Michaelis | G06Q 10/063 705/317 |

OTHER PUBLICATIONS

508checker.com, http://www.508checker.com/, printed Jan. 27, 2016.
(Continued)

*Primary Examiner* — David R Lazaro
*Assistant Examiner* — Zia Khurshid
(74) *Attorney, Agent, or Firm* — Terrile, Cannatti & Chambers; Stephen A. Terrile

(57) ABSTRACT

A system, method, and computer-readable medium for performing a web site accessibility operation. The web site accessibility operation automatically enables web site accessibility features for a differently abled user. In certain embodiments, the accessibility features are customized to ease accessibility factors. In certain embodiments, the web site accessibility operation intelligently detects a disability of a user and automatically enables web site accessibility features based upon the detected disability. When performing a web site accessibility operation, a user access a website an analyzer module determines whether the user has a disability and if so what type of disability. Based upon the determination the analyzer module automatically modifies the web site to optimize the accessibility of the web site for the identified disability.

15 Claims, 6 Drawing Sheets

(56) References Cited

OTHER PUBLICATIONS

Siteimprove Accessibility, http://siteimprove.com/, printed Jan. 27, 2016.
SortSite, Sortsite desktop, http://www.powermapper.com/products/sortsite/, printed Jan. 27, 2016.
WCAG Compliance Auditor, WCAG Compliance Auditor—Version 2, https://vimeo.com/54811235, printed Jan. 27, 2016.

* cited by examiner

Analyzing Session Data

ACCESSIBILITY FOR WEB SITES

BACKGROUND OF THE INVENTION

Field of the Invention

The present invention relates to information handling systems. More specifically, embodiments of the invention relate to improving accessibility for web sites such as social media websites.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One use of information handling systems is to provide access to and the infrastructure for the World Wide Web (often referred to as WWW or the Web). The World Wide Web is a system of Internet servers that support specially formatted documents. The documents are formatted in HyperText Markup Language (HTML) which supports links to other documents, as well as graphics, audio, and video files. The Web is an increasingly important resource in many aspects of life: education, employment, government, commerce, health care, recreation, and more. Data plays an important role across many aspects of the Web. The presence of such ubiquitous data on the web can introduce a complexity to users of the Web. When generating data for use on the Web, the data should be scrutinized to determine whether the data present is accurate, consistent, complete, and accessible anytime/anywhere. One aspect of the scrutiny relates to the accessibility of the content represented by the data.

Web accessibility means that the content is heterogeneous and is accessible from distinct IT environments as well as accessible to users with disabilities. The Web Accessibility Initiative (WAI) formulates certain guidelines and plans about the approach to make the Web accessible to everyone. The Web Content Accessibility Guidelines (WCAG) provided by the WAI, presents guideline for making Web content more accessible to people with disabilities, including blindness, low vision, deafness, hearing loss, learning disabilities, cognitive limitations, limited movement, speech disabilities, photosensitivity or combinations of these.

SUMMARY OF THE INVENTION

A system, method, and computer-readable medium are disclosed for performing a web site accessibility operation. The web site accessibility operation automatically enables web site accessibility features for a differently abled user. In certain embodiments, the accessibility features are customized to ease an accessibility factor. In certain embodiments, the web site accessibility operation intelligently detects a disability of a user and automatically enables web site accessibility features based upon the detected disability. When performing a web site accessibility operation, a user access a website an analyzer module determines whether the user has a disability and if so what type of disability. Based upon the determination the analyzer module automatically modifies the web site to optimize the accessibility of the web site for the identified disability.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
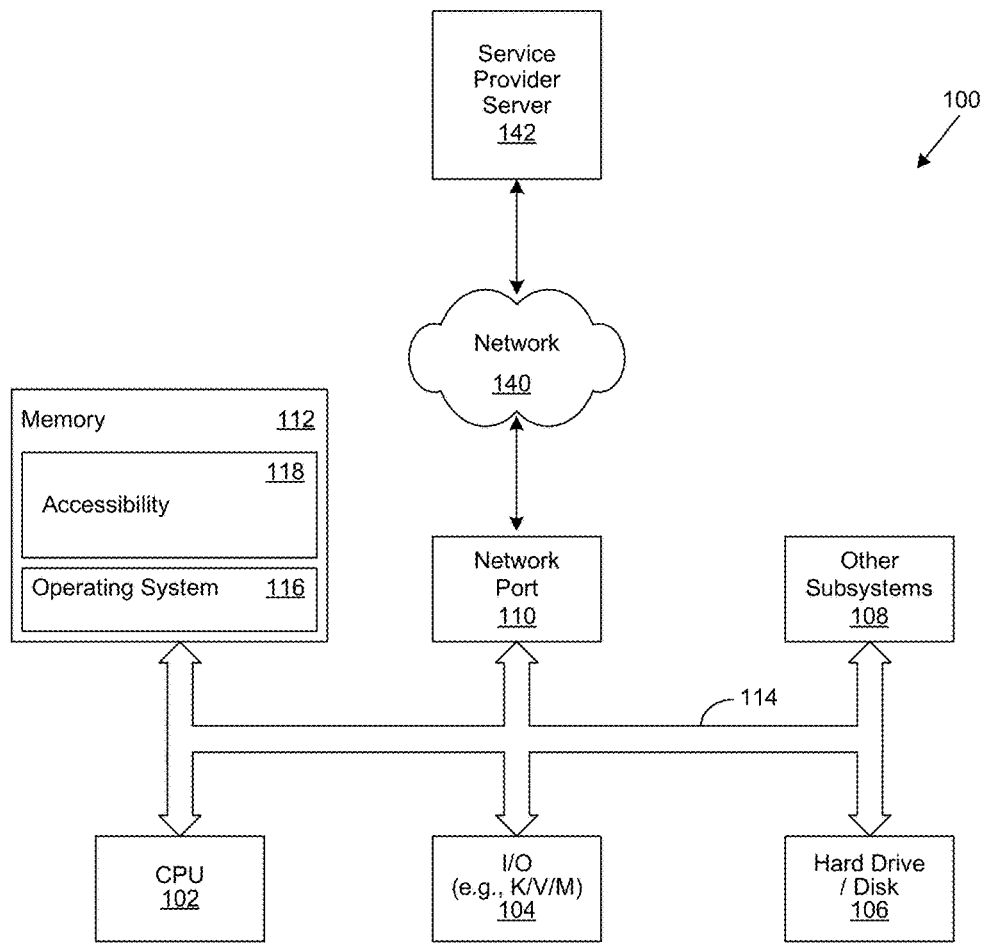
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a web site accessibility module 118.

The web site accessibility module 118 performs a web site accessibility operation. The web site accessibility operation automatically enables web site accessibility features for a differently abled user. In certain embodiments, the accessibility features are customized to ease an accessibility factor. In certain embodiments, the web site accessibility operation intelligently detects a disability of a user and automatically enables web site accessibility features based upon the detected disability. When performing a web site accessibility operation, a user access a website an analyzer module determines whether the user has a disability and if so what type of disability. Based upon the determination the analyzer module automatically modifies the web site to optimize the accessibility of the web site for the identified disability. For the purposes of this disclosure optimizing the accessibility of the web site comprises adapting the presentation and content of a web site to enable the presentation and content to be comprehended by a user having a disability or a plurality of disabilities. In various embodiments, the adapting can include one or more of providing alternatives for audio (such as closed captioning), providing alternatives for video, modifying the images and graphics of content, etc.

Figure 2:
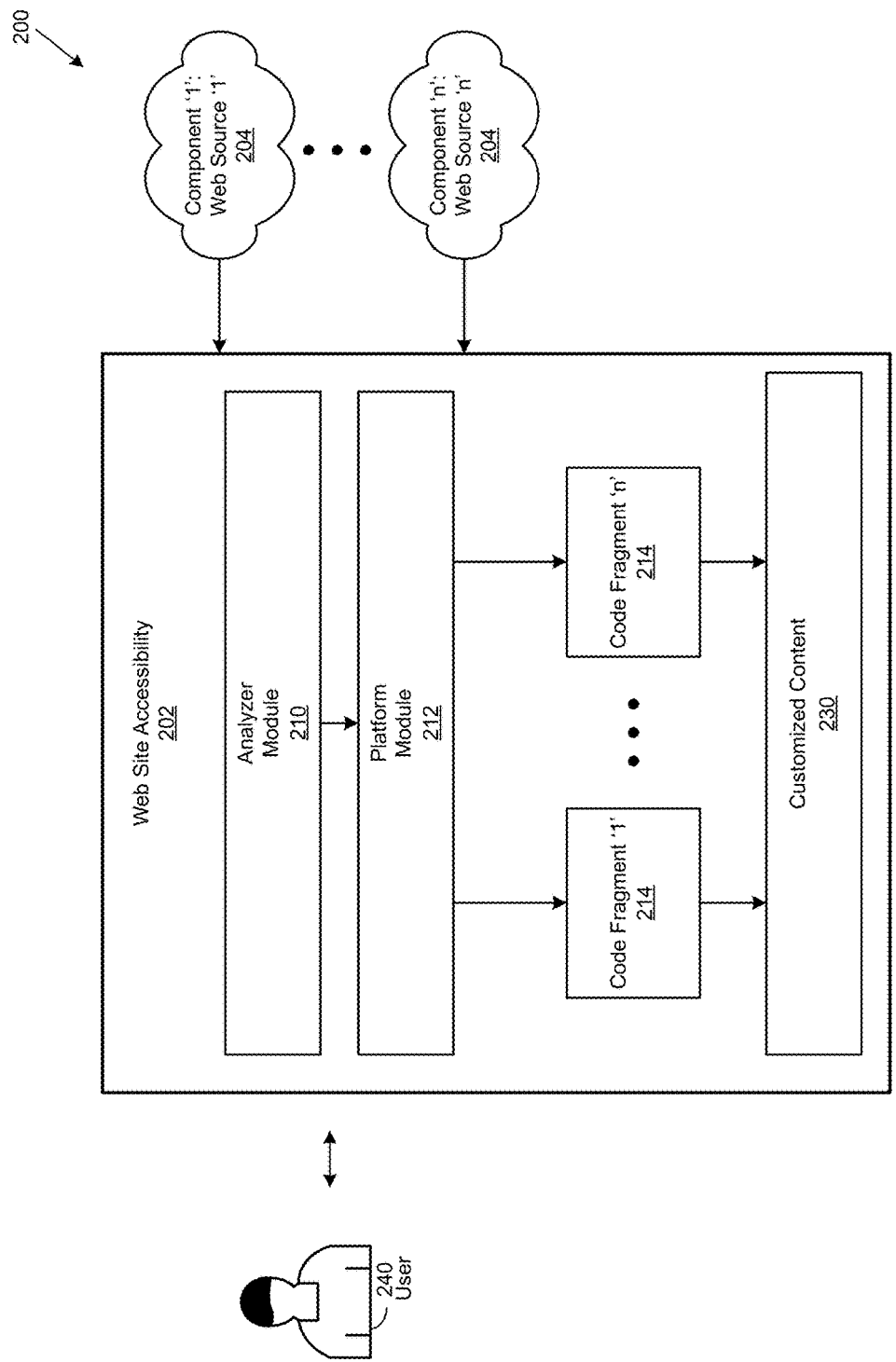
FIG. 2 shows a block diagram of a web site accessibility system.

FIG. 2 is a simplified block diagram of a web site accessibility environment 200 implemented in accordance with an embodiment of the invention. The web site accessibility environment 200 includes a web site accessibility system 202 via which a system 202 may access one or more components 204 from one or more web sources. In certain embodiments some or all of the web sources are web sites. The web site accessibility system 202 includes an analyzer module 210 and a platform module 212. Based upon information provided by the analyzer module 210 the platform module 214 generates one or more code fragments 214 (Code Fragment '1', Code Fragment 'n'). The code fragments are then used by the web site accessibility system 202 to generate customized content 230 for the environment 200.

In certain embodiments, the platform module 214 comprises a platform, such as the Telligent Evolution Platform or Oracle platforms such as the Oracle ATG Web Commerce or Oracle Endeca platforms, which is modified to include fragments of code that can be used when generating customized content. In certain embodiments, the fragments of code are activated based on usage statistics relating to various disabilities and what modifications are made to address the various disabilities. In certain embodiments, the usage statistics may be collected via session cookies. The session cookies can provide a secure and nonintrusive means for collecting usage information.

When a differently abled user attempts to access a web site such as a company social platform or support site, irrespective of the user's disability, the web site accessibility system analyzes the usage pattern based on session cookies and activates the respective code fragment or fragments to customize the web site to optimize the accessibility of the web site for the identified disability. In certain embodiments, as results are gathered over time, these recorded results can be used as a baseline for analytics to determine the content usage by differently abled people and improvise on an optimized delivery strategy.

As a user 240 attempts to access a web site, the analyzer module 210, collects usage statistics relating to the user 240 and evaluates the usage statistics by using the session cookies to determine which accessibility enhancements to provide for the user 240. In certain embodiments, the analyzer module is executing on a server of a company and interacts with social platforms of the company. For example, the analyzer module 210 determines whether there are any speech application and/or tools that are being used by the user 240 to more easily observer and/or read content on the web site. Also for example, the analyzer module 210 determines whether there are any applications and/or tools being used by the user 240 to reverse the color pattern of the web site or content within the website. If the analyzer module 210 determines that the user 240 is using an application or tool which is intended for differently abled people, a corresponding code fragment which is stored within a codebase of the platform module 212 is activated and the result is customized for usage by the user 240. Also, for scenarios where more than one application or tool are being used at the same time, the analyzer module 210 intelligently, selectively activates code fragments to work collaboratively to provide content customized for the particular combination of disabilities of the particular user 240.

As used herein, a component broadly refers to a set of data, such as a data file, that is accessible for viewing or downloading from a web source. Examples of such components include articles, white papers, announcements, user postings, blogs, photographic images, graphical images, and videos. In various embodiments, a component may be executable code (e.g., an application or bug fix), a binary file (e.g., a bitmap or video file), text data (e.g., a document), or database elements (e.g., relational database data).

Figure 3:
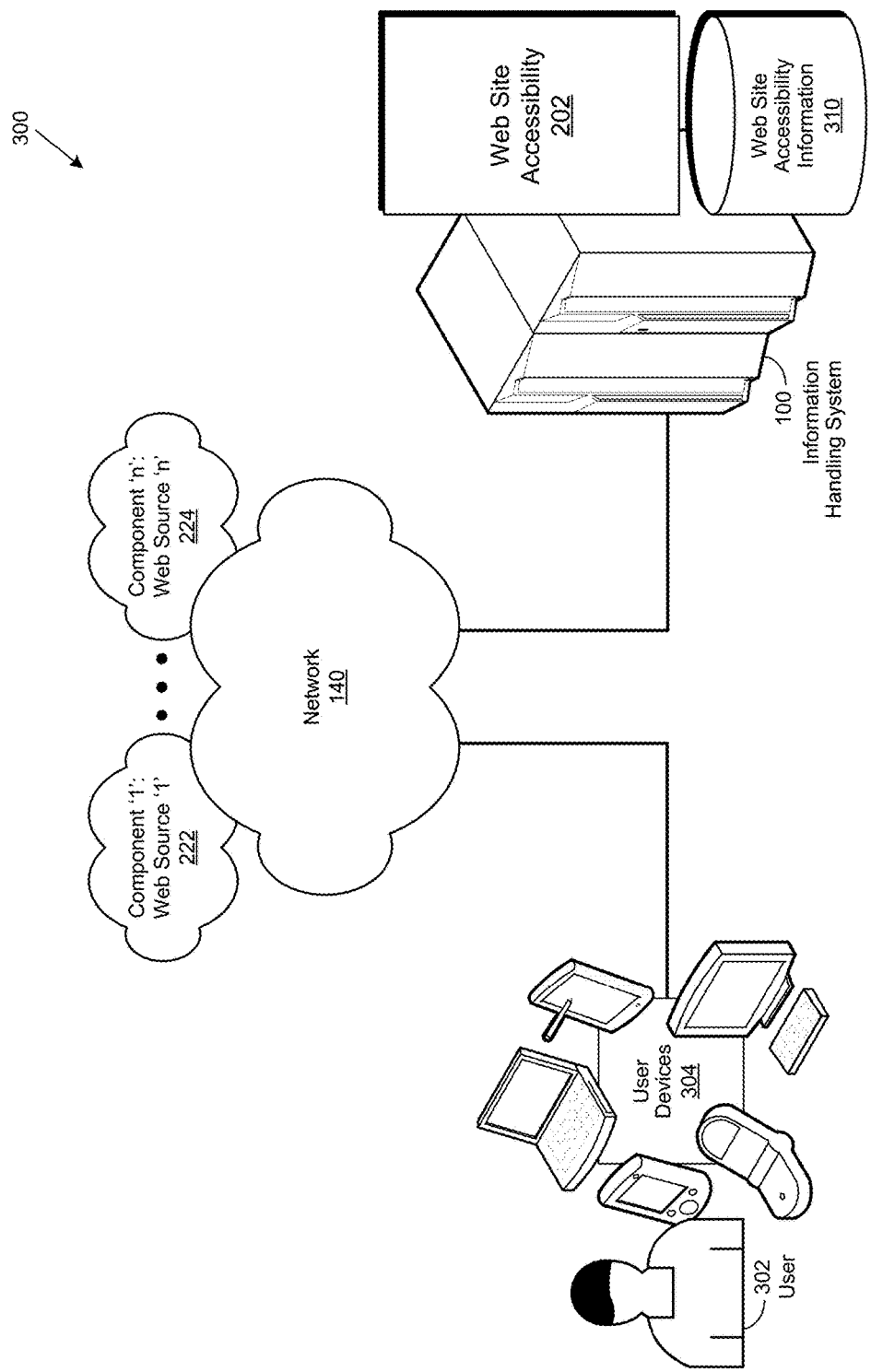
FIG. 3 shows a simplified block diagram of a web site accessibility environment.

FIG. 3 is a simplified block diagram of a web site accessibility environment 300 system implemented in accordance with an embodiment of the invention to improve web site accessibility. In this embodiment, web sources '1' 222 through 'n' 224 are respectively monitored by a web service implemented with an associated web source plugin to detect user interactions with one or more predetermined components. Information associated with such user interactions is then respectively collected from each web source '1' 222 through 'n' 224 by the web services implemented with their associated web source plugins. In various embodiments, a network 140 is used by the web services to collect the information regarding interactions from each web source '1' 222 through 'n' 224. The web services are then queried by their respective web source plugins to retrieve the information that has been collected.

Once the collected information regarding interactions is retrieved from each web service, it is provided to the web site accessibility system 202, described in greater detail herein. In various embodiments, the web site accessibility system 202 is implemented on an information handling system 100. In certain embodiments, the information handling system 100 may include a database of web site accessibility information 300, likewise described in greater detail herein. Once it is received by the web site accessibility system 202, the web site accessibility information is stored in a database of web site accessibility information 310 collected from multiple web sources.

As an example, a web page at a web source may contain various components, including ten different videos, five different white papers, and seven different industry reports.

To continue the example, other web pages at other web sources, such as web sources '1' 222 through 'n' 224, may contain some of the same components or possibly others. The web site accessibility system 202 optimizes the accessibility of these components for a particular user 302.

As used herein, a user device 304 refers to an information handling system such as a personal computer, a laptop computer, a tablet computer, a personal digital assistant (PDA), a smart phone, a mobile telephone, or other device that is capable of communicating and processing data. In certain embodiments, the user device 304 is used to receive web site accessibility information from the web site accessibility system 202 through the use of a network 140. In certain embodiments, the network 140 may be a public network, such as the Internet, a physical private network, a wireless network, a virtual private network (VPN), or any combination thereof.

Such a web site accessibility operation provides a plurality of advantages. For example, such a web site accessibility operation enhances the corporate social responsibility (CSR) statement for companies implementing the operation. Additionally, such a web site accessibility operation supports the role of web accessibility in providing equal opportunity for disabled individuals. Additionally, such a web site accessibility operation enhances interoperability, quality, enabling content on different configurations, and being prepared for advanced web technologies. Additionally, such a web site accessibility operation reduces risk of legal action, high legal expenses, and negative image of the company by adhering to WAI guidelines. Additionally, such a web site accessibility operation provides a positive impact on search engine optimization (SEO) from accessibility improvements. Additionally, such a web site accessibility operation increases customer base among people with disabilities and older people who may significantly benefit from accessible web content for companies implementing the operation. Additionally, such a web site accessibility operation increases general usability and trustworthiness of web sites having the improved accessibility.

Figure 4:
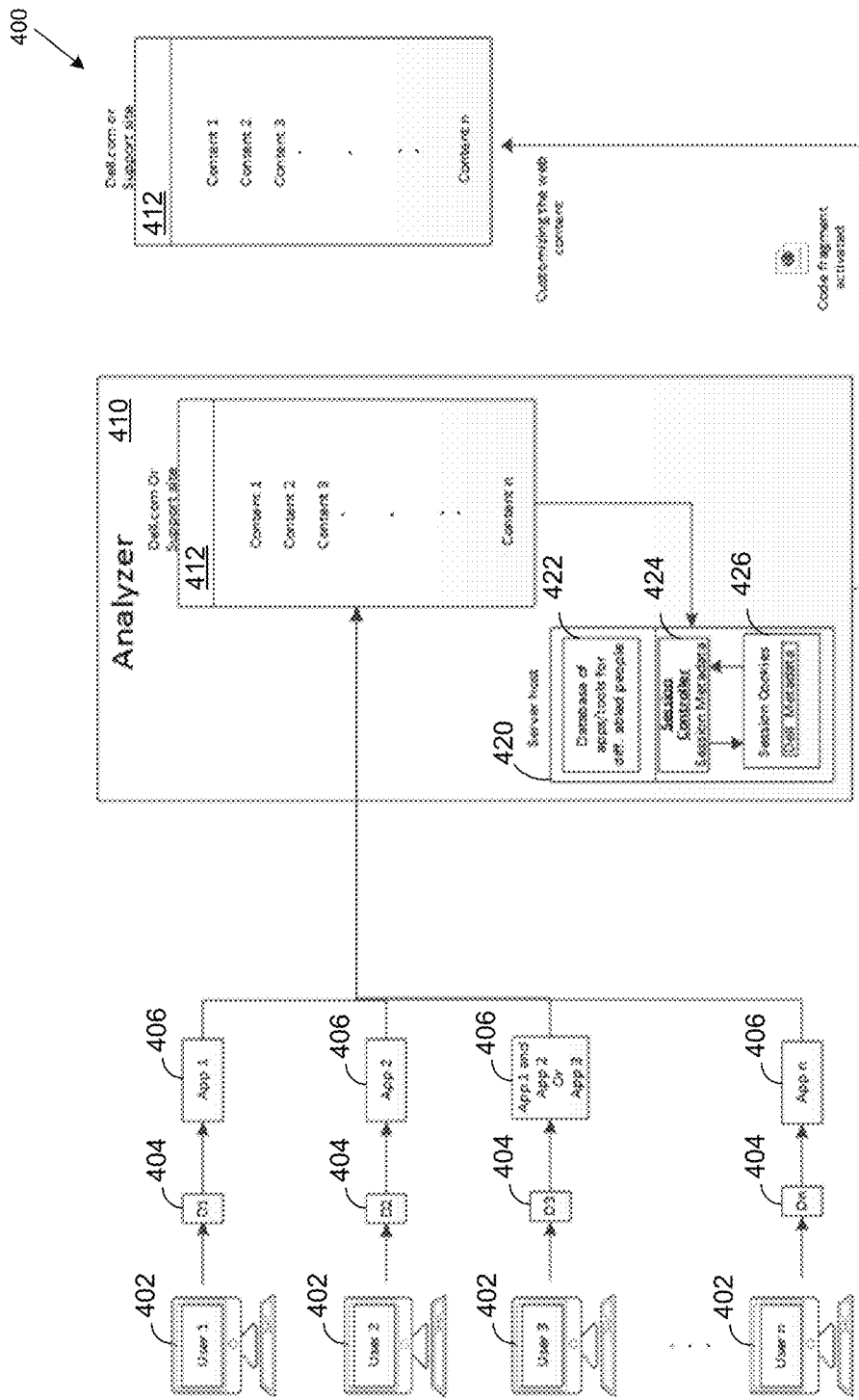
FIG. 4 shows a functional block diagram of an analyzing operation within a web site accessibility environment.

Referring to FIG. 4, a functional block diagram of an analyzing operation within a web site accessibility environment 400 is shown. The analyzing operation analyzes an application or applications being used by a user to determine which web site accessibility features to activate for the user (e.g., which code fragments to call).

More specifically, the web site accessibility environment 400 includes a plurality of users 402 (User 1, User 2, User 3, User n), where each user has an associated disability 404 (D1, D2, D3, Dn). Each of the plurality of users 402 access a respective application or applications 406. For example user 1 accesses application 1 (App 1), user 2 accesses application 2, user 3 accesses a combination of applications (App 1 and (App2 or App3)) and user n access a respective application or applications (App n).

Information regarding the application or applications accessed by a user is provided to an analyzer module 410 when the user accesses a particular web site 412. The analyzer module 410 is executing on a server host 420 which includes a database 422 of applications and/or tools used by differently abled individuals as well as a session controller 424 which interacts with one or more session cookies 426.

In certain embodiments, some or all of the applications 406 are generic. Also in certain embodiments some of all of the applications provide an output that can be matched up to a certain level, because the source components may vary by website. The analyzing operation customizes the source to meet any requirements of a differently abled individual. Customizing the source provides a better experience than the output that the individual may receive from a generic application or tool.

In certain embodiments, the analyzing operation includes analyzing session cookies 426 such that code fragment activation is based on evaluation of the session cookies. By using a session cookie, the analyzing operation can track the usage based on the sessions and thus not require analysis of a large amount of historical data. In various embodiments, the session cookie stores information regarding one or more of individual user preferences, language used to view the content, region from which the content is accessed, internet protocol (IP) address, what applications are being used by the individual as extensions or plug-ins to facilitate easy accessibility, etc. In certain embodiments, the session cookie 426 is stored in the server host 420. Thus, if the analyzer receives a request from the same user in future whether or not the request is from the same user device, the analyzer can easily service the request.

When the user accesses a web site a session cookie 426 is created. In certain embodiments, the analyzer evaluates the session cookie 426 to determine whether any applications or tools intended for differently abled people are being used. In certain embodiments, the session cookies are stored in a text (e.g., .txt) format. The database 422 is updated regularly to maintain up-to-date information about newly developed applications and tools.

Figure 5:
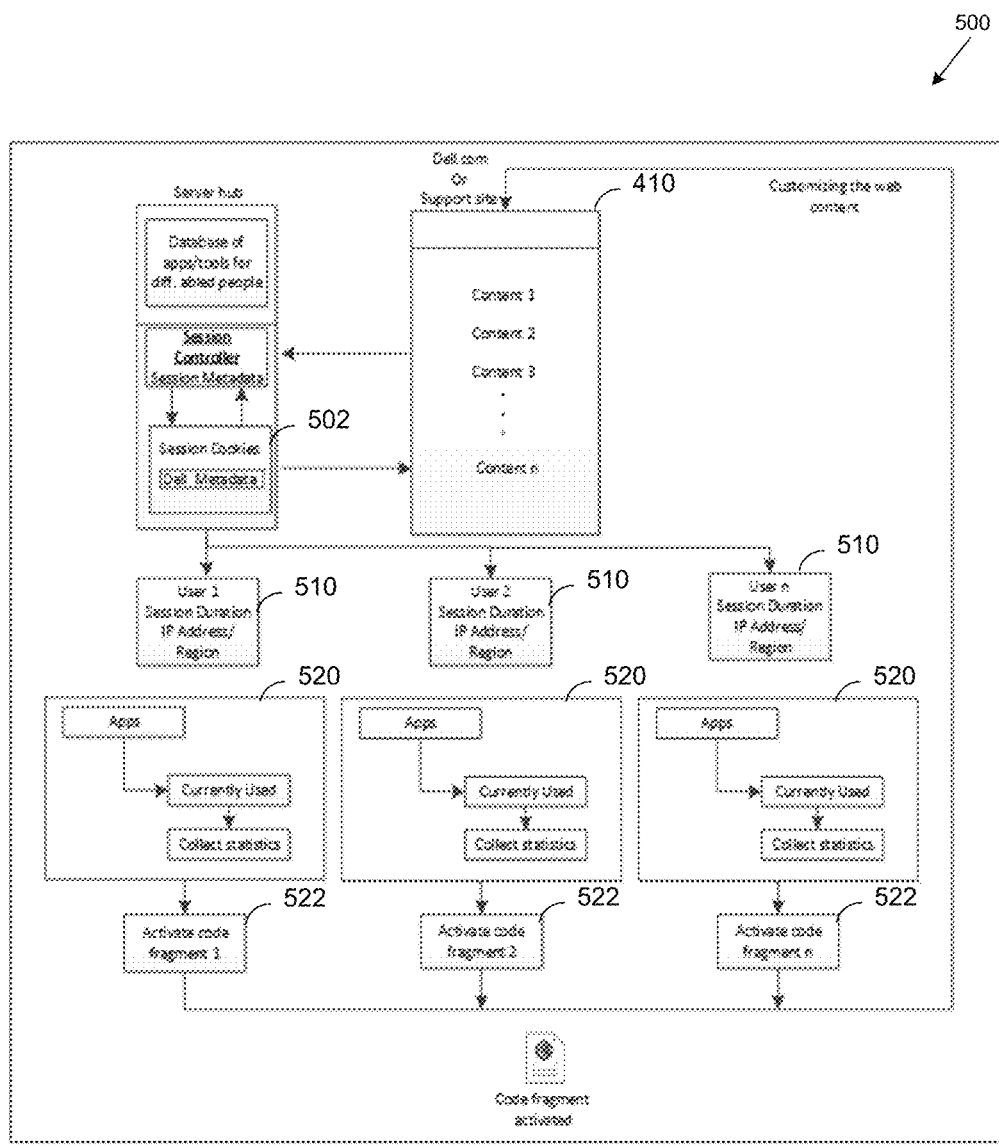
FIG. 5 shows a functional block diagram of an analyzing session data operation within a web site accessibility environment.

Referring to FIG. 5, a functional block diagram of an analyzing session data operation within a web site accessibility environment 500 is shown. In certain embodiments, each session cookie 502 is unique, based on a respective users and browser. From the individual session cookies 502, the analyzer 410 determines which code fragments should be activated to provide a web site 430 with web site accessibility designed for the unique individual user 402. The analyzer 410 also collects session duration information 510 and IP address information 512 (to identify a region with which the individual is associated) for analytics purposes. In certain embodiments, the session duration information and/or IP address information 510 may be stored within a metadata portion of each session cookie 502. Additionally, in certain embodiments, statistics are collected via a statistics collection module 520 regarding application usage for each individual user to further determine which code fragments 522 should be activated for each individual user.

Figure 6:
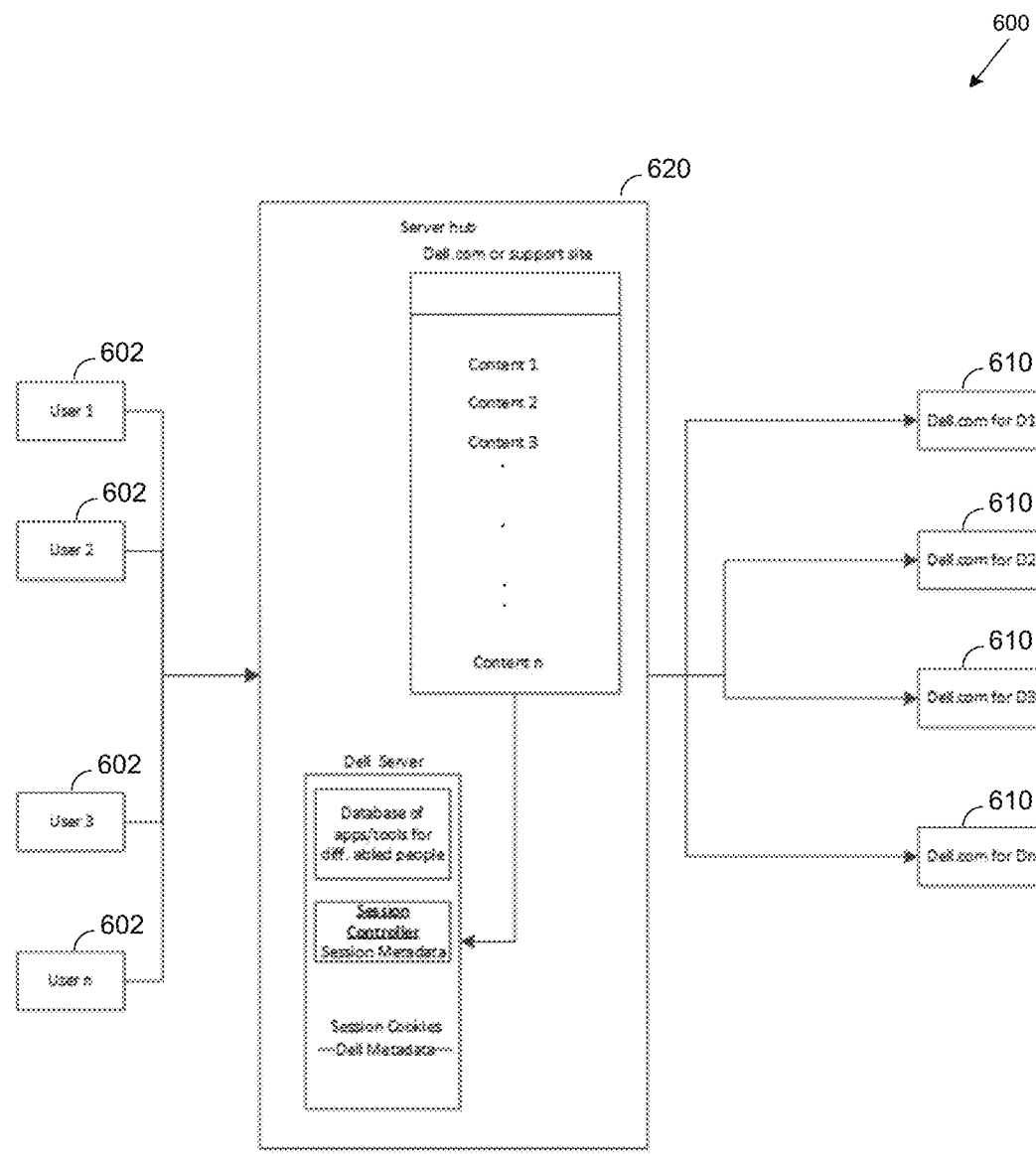
FIG. 6 shows a functional block diagram of a customized web site operation within a web site accessibility environment.

Referring to FIG. 6, a functional block diagram of a customized web site operation within a web site accessibility environment 600 is shown. More specifically, by performing an analysis operation for each user 602 (User 1, User 2, User 3, User 4), a customized web site 610 is presented for each respective user. The analysis operation includes using a server hub 620 to access the session cookie for a particular user and identify code segments (e.g., content 1, content 2, content 3, content n) that correspond to a disability associated with the particular user. This customized web site provides components specifically enhanced for the individual user 602.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a web site accessibility operation within a web site accessibility environment, the web site accessibility environment comprising a web site accessibility system implemented on an information handling system, a database of web site accessibility information, and a plurality of web sources, the plurality of web sources communicating with the web site accessibility system via a network, comprising:
   monitoring, via the web site accessibility system, a web site of one of the plurality of web sources for when an individual accesses the web site;
   determining, via the web site accessibility system, whether the individual has an associated disability, the determining comprising intelligently detecting a disability of the individual based upon applications executing on a user device of the individual, the intelligently detecting comprising analyzing respective session cookies associated with the applications; and,
   automatically modifying the web site to compensate for the associated disability via the web site accessibility system, the automatically modifying using web site accessibility information retrieved from the database of website accessibility information, the automatically modifying comprising accessing code fragments to generate customized content within the web site, the customized content compensating for the associated disability.

2. The method of claim 1, wherein:
   the automatically modifying comprises one or more of providing alternatives for audio, providing alternatives for video, modifying images of content and modifying graphics of content; and,
   the alternatives for audio, alternatives for video, images of content and graphics of content being associated with a company support site.

3. The method of claim 1, wherein:
   the determining comprises performing an analyzing operation, the analyzing operation analyzing a usage pattern of the individual and associating a disability with the individual based upon the usage pattern.

4. The method of claim 3, wherein:
   the usage pattern of the individual is based upon an evaluation of a session cookie associated with the individual.

5. The method of claim 4, wherein:
   the session cookie stores information regarding one or more of individual user preferences, language used to view the content, region from which the content is accessed, internet protocol (IP) address, what applications are being used by the individual as at least one of extensions and plug-ins to facilitate easy accessibility.

6. A system comprising:
a processor;
a data bus coupled to the processor; and
a non-transitory, computer-readable storage medium embodying computer program code for performing a web site accessibility operation within a web site accessibility environment, the web site accessibility environment comprising a web site accessibility system implemented on an information handling system, a database of web site accessibility information, and a plurality of web sources, the plurality of web sources communicating with the web site accessibility system via a network, the non-transitory, computer-readable storage medium being coupled to the data bus, the computer program code interacting with a plurality of computer operations and comprising instructions executable by the processor and configured for:
monitoring, via the web site accessibility system, a web site of one of the plurality of web sources for when an individual accesses the web site;
determining, via the web site accessibility system, whether the individual has an associated disability, the determining comprising intelligently detecting a disability of the individual based upon applications executing on a user device of the individual, the intelligently detecting comprising analyzing respective session cookies associated with the applications; and,
automatically modifying the web site to compensate for the associated disability via the web site accessibility system, the automatically modifying using web site accessibility information retrieved from the database of website accessibility information, the automatically modifying comprising accessing code fragments to generate customized content within the web site, the customized content compensating for the associated disability.

7. The system of claim 6, wherein:
the automatically modifying comprises one or more of providing alternatives for audio, providing alternatives for video, modifying images of content and modifying graphics of content; and,
the alternatives for audio, alternatives for video, images of content and graphics of content being associated with a company support site.

8. The system of claim 6, wherein:
the determining comprises performing an analyzing operation, the analyzing operation analyzing a usage pattern of the individual and associating a disability with the individual based upon the usage pattern.

9. The system of claim 8, wherein:
the usage pattern of the individual is based upon an evaluation of a session cookie associated with the individual.

10. The system of claim 9, wherein:
the session cookie stores information regarding one or more of individual user preferences, language used to view the content, region from which the content is accessed, internet protocol (IP) address, what applications are being used by the individual as at least one of extensions and plug-ins to facilitate easy accessibility.

11. A non-transitory, computer-readable storage medium embodying computer program code for performing a web site accessibility operation within a web site accessibility environment, the web site accessibility environment comprising a web site accessibility system implemented on an information handling system, a database of web site accessibility information, and a plurality of web sources, the plurality of web sources communicating with the web site accessibility system via a network, the computer program code comprising computer executable instructions configured for:
monitoring, via the web site accessibility system, a web site of one of the plurality of web sources for when an individual accesses the web site;
determining, via the web site accessibility system, whether the individual has an associated disability, the determining comprising intelligently detecting a disability of the individual based upon applications executing on a user device of the individual, the intelligently detecting comprising analyzing respective session cookies associated with the applications; and,
automatically modifying the web site to compensate for the associated disability via the web site accessibility system, the automatically modifying using web site accessibility information retrieved from the database of website accessibility information, the automatically modifying comprising accessing code fragments to generate customized content within the web site, the customized content compensating for the associated disability.

12. The non-transitory, computer-readable storage medium of claim 11, wherein:
the automatically modifying comprises one or more of providing alternatives for audio, providing alternatives for video, modifying images of content and modifying graphics of content; and,
the alternatives for audio, alternatives for video, images of content and graphics of content being associated with a company support site.

13. The non-transitory, computer-readable storage medium of claim 11, wherein:
the determining comprises performing an analyzing operation, the analyzing operation analyzing a usage pattern of the individual and associating a disability with the individual based upon the usage pattern.

14. The non-transitory, computer-readable storage medium of claim 13, wherein:
the usage pattern of the individual is based upon an evaluation of a session cookie associated with the individual.

15. The non-transitory, computer-readable storage medium of claim 14, wherein:
the session cookie stores information regarding one or more of individual user preferences, language used to view the content, region from which the content is accessed, internet protocol (IP) address, what applications are being used by the individual as at least one of extensions and plug-ins to facilitate easy accessibility.

* * * * *